United States Patent
Sylthe et al.

(10) Patent No.: US 9,608,948 B2
(45) Date of Patent: Mar. 28, 2017

(54) METHOD FOR PRESENTING AN ATTACHMENT WITHIN AN EMAIL MESSAGE

(71) Applicant: BlackBerry Limited, Waterloo (CA)

(72) Inventors: Olav A. Sylthe, Oslo (NO); Dan Mihai Dumitru, Sandy Springs, GA (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 503 days.

(21) Appl. No.: 14/068,296

(22) Filed: Oct. 31, 2013

(65) Prior Publication Data

US 2014/0059150 A1    Feb. 27, 2014

Related U.S. Application Data

(63) Continuation of application No. 11/395,656, filed on Mar. 31, 2006, now Pat. No. 8,601,063.

(51) Int. Cl.
| | |
|---|---|
| H04L 12/58 | (2006.01) |
| G06F 17/30 | (2006.01) |
| G06Q 10/10 | (2012.01) |

(52) U.S. Cl.
CPC ........ *H04L 51/08* (2013.01); *G06F 17/30899* (2013.01); *G06Q 10/107* (2013.01); *H04L 51/06* (2013.01)

(58) Field of Classification Search
CPC ....... G06Q 10/107; H04L 51/08; H04L 51/06; G06F 17/30899
USPC .......................................... 709/206, 217, 246
See application file for complete search history.

(56) References Cited

U.S. PATENT DOCUMENTS

| | | | |
|---|---|---|---|
| 6,604,144 B1 * | 8/2003 | Anders | .......... H04L 29/06 709/231 |
| 8,185,591 B1 * | 5/2012 | Lewis | .......... G06Q 10/107 358/1.15 |
| 8,601,063 B2 | 12/2013 | Sylthe et al. | |
| 2002/0161796 A1 * | 10/2002 | Sylthe | .......... G06F 17/30905 715/234 |
| 2005/0102638 A1 * | 5/2005 | Jiang | .......... G06F 3/0482 715/855 |
| 2007/0035764 A1 * | 2/2007 | Aldrich | .......... G06F 17/3028 358/1.15 |

* cited by examiner

*Primary Examiner* — Abdulkader M Alriyashi
(74) *Attorney, Agent, or Firm* — Perry + Currier, Inc.

(57) ABSTRACT

A method for presenting an attachment within an email message on a display of a portable electronic device includes displaying the email message using a messaging application, sending a conversion request to an attachment server in order to view the attachment in an attachment viewer of the portable electronic device, receiving a converted attachment from the attachment server; and upon receiving the converted attachment from the attachment server, inserting a thumbnail image in a message body of the email message.

17 Claims, 6 Drawing Sheets

METHOD FOR PRESENTING AN ATTACHMENT WITHIN AN EMAIL MESSAGE

FIELD

The present embodiment relates to email messages and in particular, a method for presenting an attachment in an email message of a portable electronic device.

BACKGROUND

It is becoming increasingly popular to send photographs, scanned documents, slide shows, PDF documents and other types of attachments in email messages. Each attachment is provided with a filename and is linked to an email message in a manner that is well known in the art. Often, a single email message may contain multiple attachments.

Attachments are generally opened when an email message first arrives and subsequently stored along with the message in a recipient's inbox. At a later time or date, the email message is typically re-opened by the recipient so that attachments may be filed, forwarded and/or deleted, for example. It is unlikely that the recipient will recall the contents of every attachment and since the character length of attachment filenames is limited, it is not always easy to determine the contents of an attachment from its filename. Therefore, it is often necessary for the recipient to re-open every attachment in order to determine its contents. This process can be very time consuming, particularly in the case where an email recipient is searching for a specific attachment.

BRIEF DESCRIPTION OF THE DRAWINGS

The embodiment will be better understood with reference to the following Figures in which like numerals denote like parts and in which.

DETAILED DESCRIPTION

Figure 1:
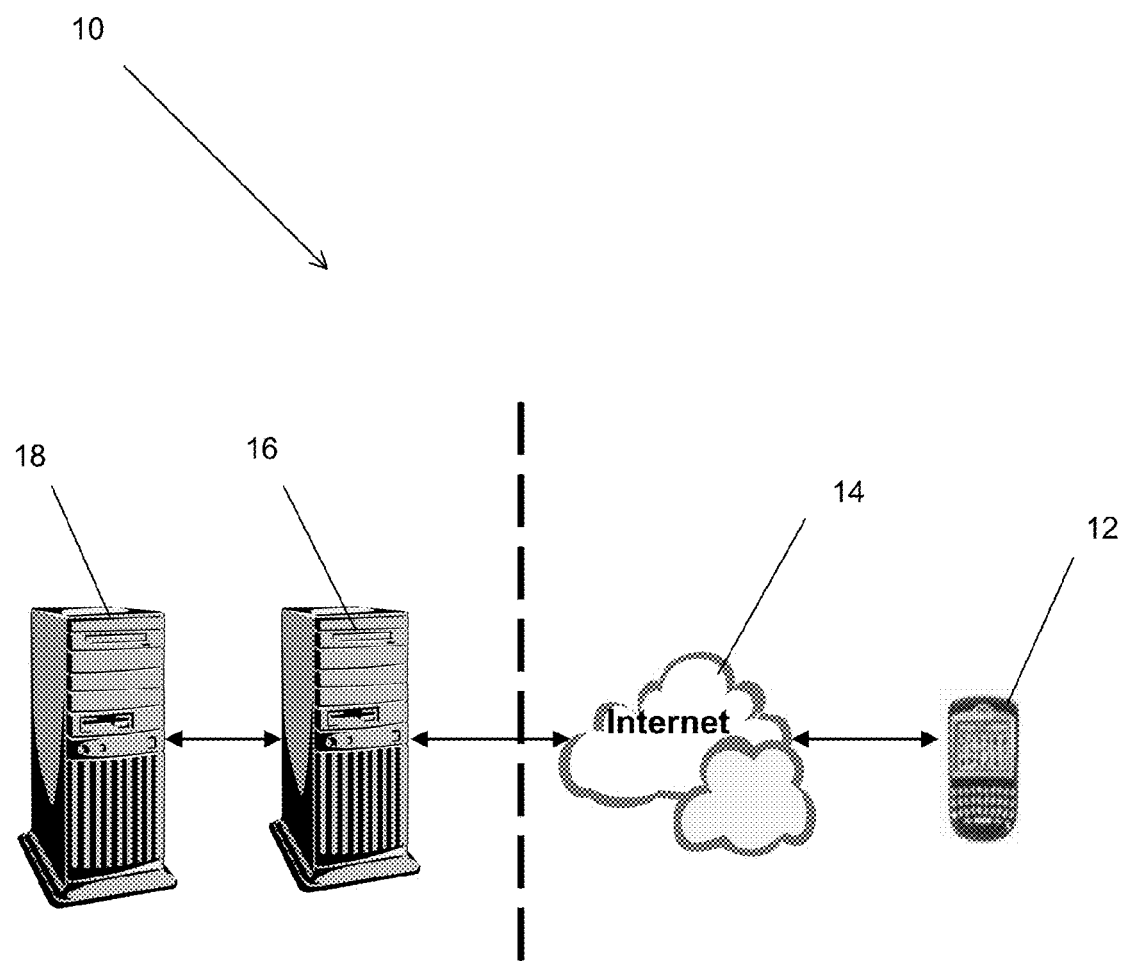
FIG. 1 is a schematic diagram of a wireless communication system.

Referring to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN Mobitex, DataTAC networks, EDGE or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as an attachment server. The attachment server communicates with an email client and an attachment viewer to allow a user to view files that are received in email messages. The attachment server may alternatively be a separate server.

Figure 2:
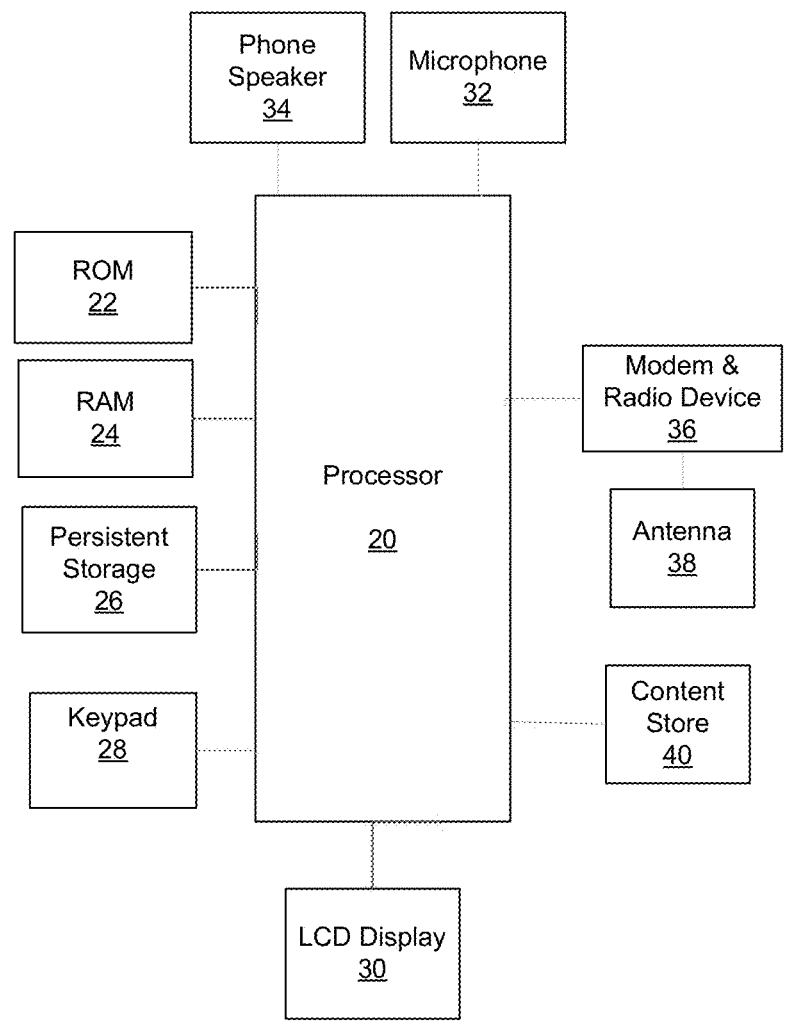
FIG. 2 is a block diagram of components of a portable electronic device according to an embodiment.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones and laptop computers.

The portable electronic device 12 is based on a microcomputer including a processor 20 connected to a read-only-memory (ROM) 22 that contains a plurality of applications executable by the processor 20 that enables each portable electronic device 12 to perform certain functions including, for example, PIN message functions, SMS message functions and cellular telephone functions. The processor 20 is also connected to a random access memory unit (RAM) 24 and a persistent storage device 26 which are responsible for various non-volatile storage functions of the portable electronic device 12. The processor 20 receives input from various input devices including a keypad 28. The processor 20 outputs to various output devices including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the portable electronic device 12, is also provided. The content store 40 stores email message attachments locally on the portable electronic device 12 after the attachments have been viewed using the attachment viewer.

Figure 3A:
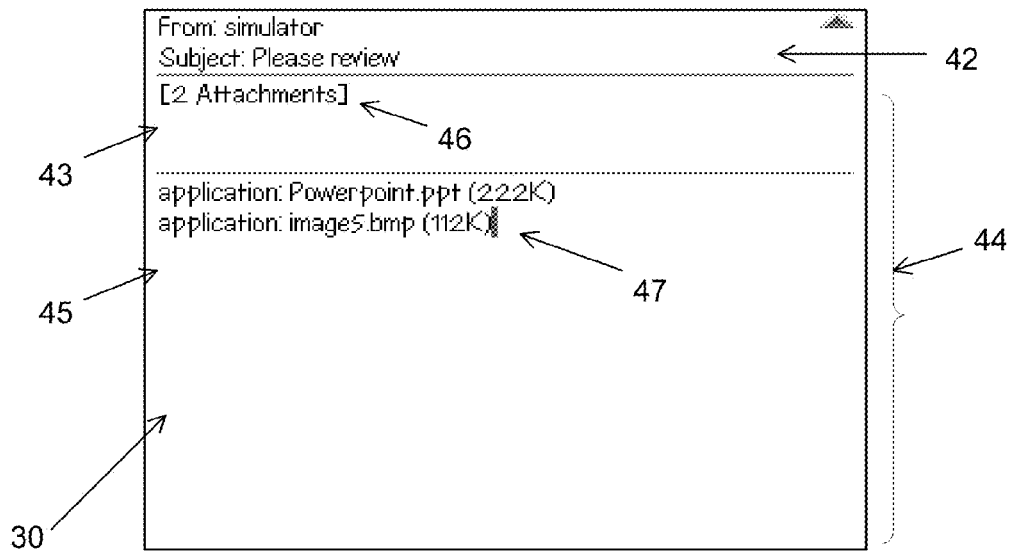
FIG. 3a is screen shot of the portable electronic device of FIG. 2.
Figure 3B:
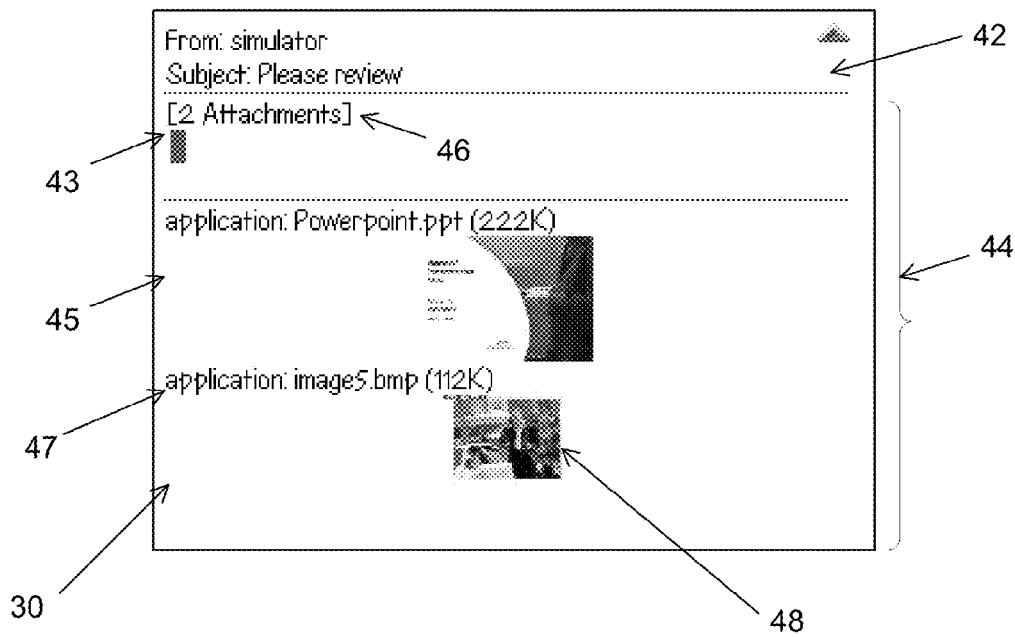
FIG. 3b is another screen shot of the portable electronic device of FIG. 2.

Referring now to FIGS. 3a and 3b, screen shots of display 30 of portable electronic device 12 according to an embodiment is shown. As shown, an email message includes a message header 42 and a message body 44. The message header 42 typically includes several fields. In the example of FIGS. 3a and 3b, only a "from" field, which identifies the sender of the email message, and a "subject" field, which generally describes the contents of the email message, are provided, however, it will be appreciated by a person skilled in the art that the email message may also include a "to" field and a "cc" field, for example. The message body 44 is divided into two parts, a message text portion 43 and an attachment portion 45. Message text (not shown) appears in the message text portion 43 below the attachment number text 46, which is generated automatically and indicates the number of attachments that are provided in the email message. Attachment filenames 47 of attachments to the email message are provided in the attachment portion 45 of the message body 44 and, in FIG. 3b, corresponding thumbnail images 48 of the attachments are provided so that the user may easily identify the contents of the respective attachments.

As shown in FIGS. 3a and 3b, when an email message is opened for the first time, no thumbnail images 48 are provided in the message body 44, however, once the attachments of the email message have been viewed, the attachment data is stored locally on the portable electronic device 12 so that each subsequent time the email message is opened, a thumbnail image 48 that corresponds to the attachment is provided in the message body 44.

Figure 4:
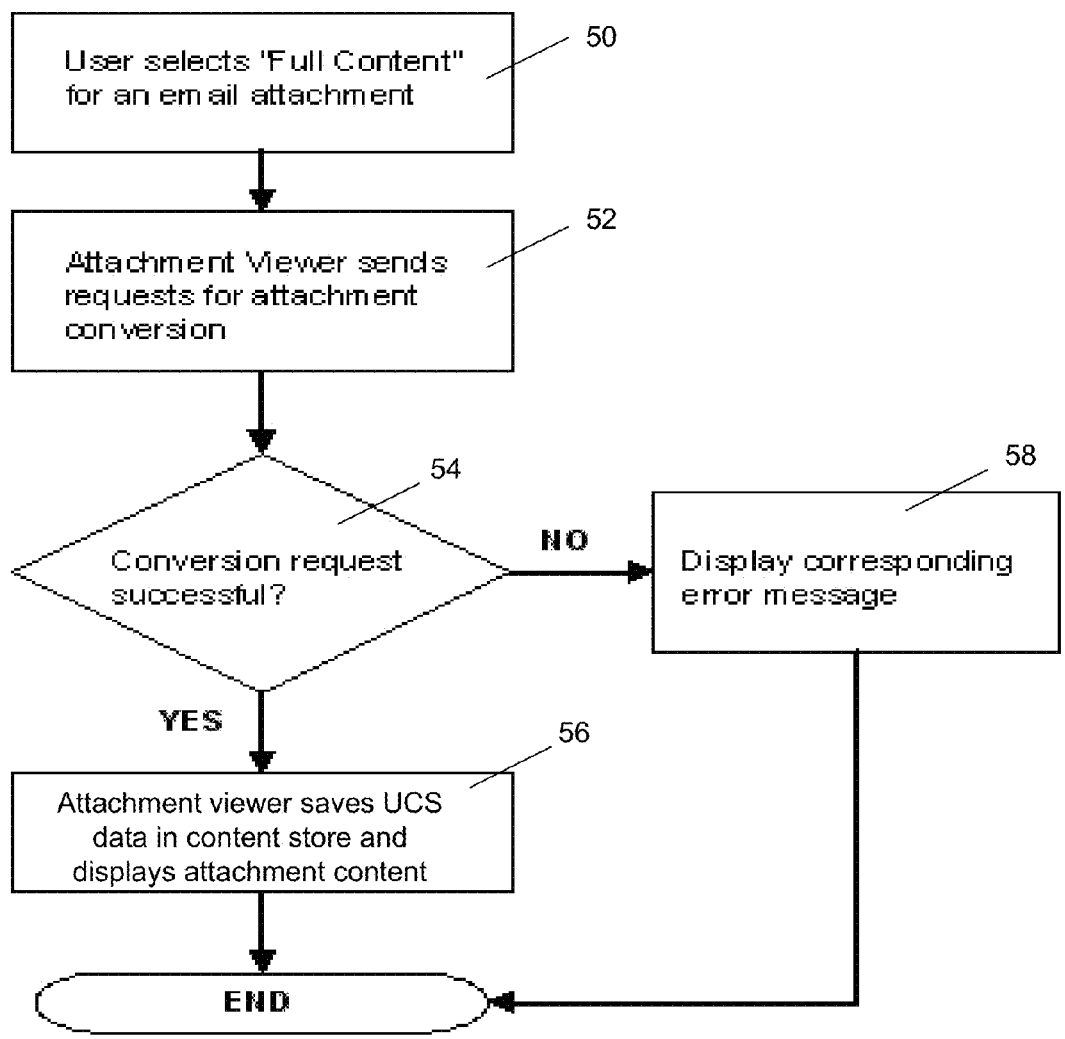
FIG. 4 is a flowchart depicting operation of an attachment viewer of the portable electronic device of FIG. 2.

Request/view functionality for an attachment is provided by the attachment viewer and the attachment server. The attachment viewer, which is an application that is run by the processor 20 of the portable electronic device 12, displays images that correspond to attachments. Referring to FIG. 4, the user selects a "full content" option from a pull down menu, as indicated at step 50, in order to request that an attachment be viewed. In the case of an attachment that is being opened for the first time, the attachment viewer sends a request for attachment conversion to the attachment server, as indicated at step 52. Success or failure of the attachment conversion is determined at step 54. If the conversion request is successful, the attachment viewer saves Universal Content Stream (UCS) data that is returned from the attachment server in the content store 40 and displays the attachment content, as indicated at step 56. If the conversion is unsuccessful, a corresponding error message is displayed, as indicated at step 58.

Figure 5:
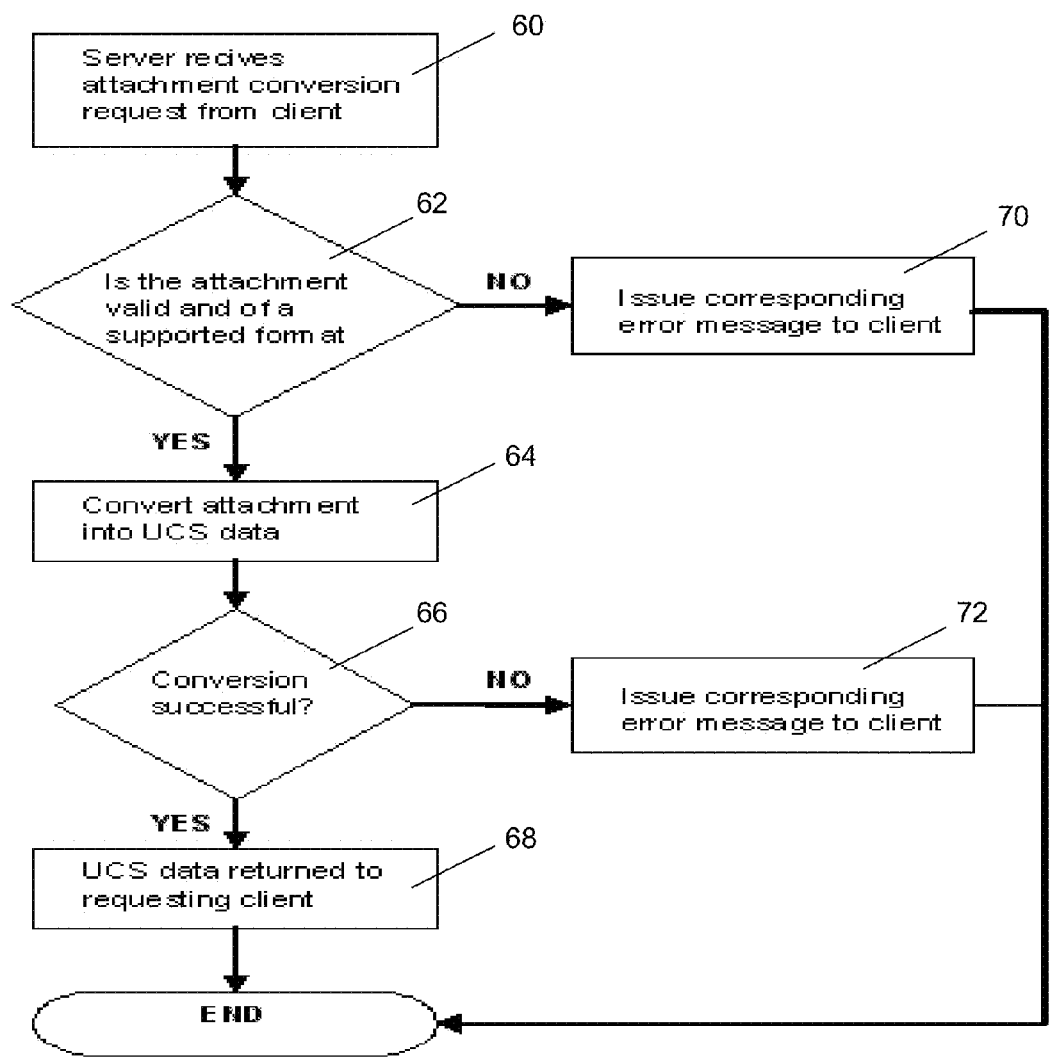
FIG. 5 is a flowchart depicting operation of an attachment server in connection with the portable electronic device of FIG. 2.

Referring also to FIG. 5, the attachment server receives an attachment conversion request from the attachment viewer of the portable electronic device 12, as indicated at step 60. Then, at step 62, the attachment server determines if the attachment is valid and of a supported format. If the attachment is valid and supported, the attachment is converted into UCS data, as indicated at step 64. Once converted, the attachment server determines whether or not the conversion was successful at step 66. If successful, the UCS data is returned to the requesting portable electronic device 12, as indicated at step 68. If the attachment is either not valid or of an unsupported format, or both, an error message is returned to the portable electronic device 12, as indicated at step 70. Similarly, if the conversion step 64 of the attachment is unsuccessful, an error message is returned to the portable electronic device 12, as indicated at step 72.

The attachment server supports both image and non-image formats. Images, which have file formats such as JPEG, GIF, BMP, PNG and TIFF, for example, are converted directly to JPEG files at the attachment server, encapsulated in UCS data and returned to the attachment viewer, where the images are displayed in JPEG format.

Non-image file formats, such as Microsoft PowerPoint™ PPT, for example, are rendered in order to produce a bitmap file at the attachment server. In the case of a PPT file, for example, an empty bitmap is created in memory and then an image representation of a first slide, or cover page, as it would appear on a normal desktop computer, is stored therein. The off screen bitmap is also referred to as a memory bitmap since the image is not actually viewed by a user but produced at the attachment server. Once produced, the bitmaps are converted to JPEG format, encapsulated in UCS data and returned to the attachment viewer, where the images are displayed in JPEG format. Any non-image file format may be rendered. Types of renderable formats include: Microsoft Office™ formats including PowerPoint™, Word™ and Excel™, as well as other formats, such as WordPerfect™, Adobe Acrobat™ and Corel™, for example. The rendering process is disclosed in U.S. Pat. No. 7,640,311 filed on even date herewith entitled "Method for viewing non-image attachments on a portable electronic device", which is herein incorporated by reference.

The attachment server further resizes the images before the JPEG images are encapsulated into UCS data and sent to the attachment viewer. By performing the re-size operation on the attachment server, bandwidth and portable electronic device 12 memory usage are minimized. The attachments are re-sized from their original width and height to fit the display 30 of the portable electronic device 12. During the re-size operation, the aspect ratio is maintained as follows. If the width and height of the original image exceeds the width and height of the display 30 of the portable electronic device 12, the image is re-sized to match the display 30. For example, a scanned TIFF attachment having a resolution of approximately 1700×2100 pixels is re-sized to fit on the display 30, which has approximately 240×160 pixels. In this example, the image height is greater than the image width, therefore, the height is selected as the base dimension for scaling and the aspect ratio of the original image is maintained so that the content of the resulting image is smaller than the display 30.

If the width and height of the original image is less than or equal to the width and height of the portable electronic device display 30, no re-size operation is performed. If the width of the original image exceeds the width of display 30 and the height of the original image is less than or equal to the height of the display 30, then the original image is re-sized to the width of the display 30 and the height of the original image is adjusted according to the image aspect ratio. Finally, if the height of the original image exceeds the height of display 30 and the width of the original image is less than or equal to the width of the display 30, then the original image is re-sized to the height of the display 30 and the width of the original image is adjusted according to the image aspect ratio.

Figure 6:
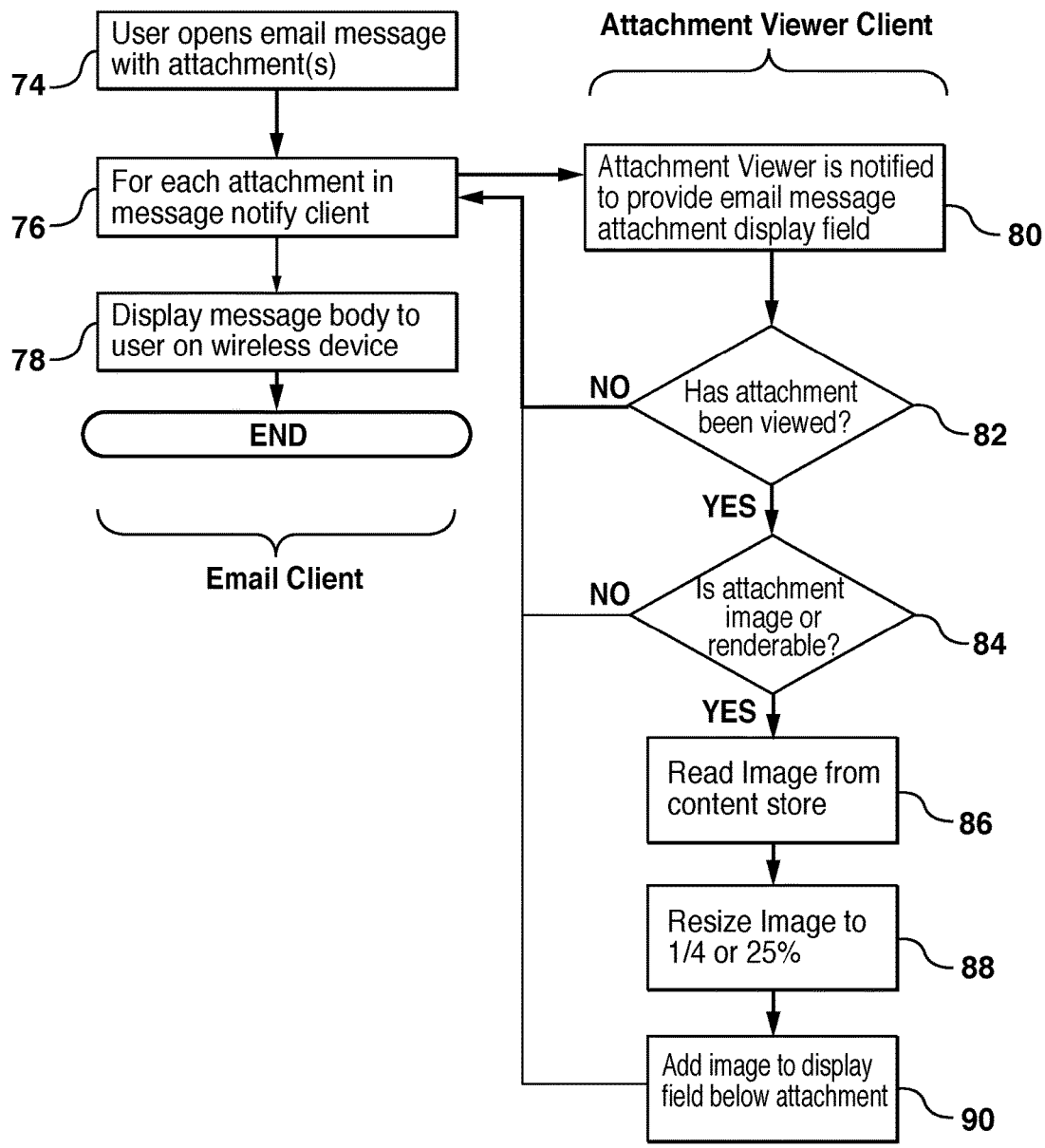
FIG. 6 is a flowchart depicting operation of a messaging application and an attachment viewer of the portable electronic device of FIG. 2.

Referring to FIG. 6, a method for presenting an attachment within an email message according to an embodiment is generally shown. The method includes operations that occur in an email client of the portable electronic device 12 and operations that occur in an attachment viewer client. The email client is a messaging application that is stored in non-volatile RAM 24 along with other applications running on the portable electronic device 12. The email client is capable of sending and receiving electronic messages.

As shown, at step 74, the user opens an email message having at least one attachment. For each attachment, the messaging application notifies the attachment viewer client, as indicated at step 76. The attachment viewer receives the notification to update an attachment portion 45, or display field, of the message body 44 in which each attachment is presented, as indicated at step 80. At step 82, the attachment viewer determines if the attachment has been previously viewed. If the attachment has not been previously viewed, no image is returned to the messaging application and the messaging application displays the email message on the display 30 of the portable electronic device 12, as indicated at step 78.

If the attachment has been previously viewed, the attachment viewer then determines whether the attachment is an image and, if not, the attachment viewer determines whether the attachment is renderable, as indicated at step 84. The attachment viewer determines if an attachment is an image by checking the attachment type. If the attachment type is not an image, the attachment viewer then determines if the previously viewed attachment is renderable. The attachment viewer checks for renderable Document Object Model (DOM) identifiers inside a server descriptor, which is returned to the attachment viewer when the attachment is first opened and a DOM corresponding to the attachment is created. Graph based DOM structure is disclosed in United States Patent Application No. 2006/0055693, which is herein incorporated by reference. If no renderable DOM identifiers are found, the attachment viewer determines that the previously viewed attachment is not renderable and is therefore unable to return an image to the messaging application. The messaging application then displays the email message, as indicated at step 78.

If the attachment has been previously viewed and is an image or is renderable, the attachment viewer retrieves the image from the content store 40 of the portable electronic device 12 at step 86. At step 88, the image is resized to 25% of its size and then the image is added to the display field below the attachment filename 46, as indicated at step 90. The email message is then displayed to the user of the portable electronic device 12, as indicated at step 78.

The size of the thumbnail 48 varies for different attachments since the size of each image that is returned from the attachment server and saved in the content store 40 varies based on the aspect ratio of the original image. It will therefore be appreciated by a person skilled in the art that the thumbnail 48 is not limited to being resized to 25%. The thumbnail 48 may be resized to occupy between 15% and 40% of the display 30 or alternatively may be of any size that allows the user to quickly determine the contents of the attachment.

In operation, the user receives an email message through the messaging application of the portable electronic device 12 and opens the email message, which has a similar format to the email message that is shown in FIG. 3*a*. The user then selects and views an attachment of the email message using the attachment viewer. If there is more than one attachment, the user views the additional attachments consecutively using the attachment viewer. As each attachment is opened, the attachment server returns the image and a thumbnail image 48 of the respective attachment appears in the attachment portion 45 of the messaging body 44, as shown in FIG. 3*b*. The thumbnail images 48 are retrieved from the content store 40 of the portable electronic device 12 so that following the initial attachment opening, no further communication with the attachment server is necessary. In order to view the attachment again in full size, the user selects the thumbnail and the image is displayed by the attachment viewer. Again, no communication with the attachment server is necessary because the attachment image data is retrieved locally from the portable electronic device content store 40.

A specific embodiment of the present embodiment has been shown and described herein. However, modifications and variations may occur to those skilled in the art. For example, although the portable electronic device 12 has been described having cellular telephone capabilities, the described embodiment is not limited to portable electronic devices having both cellular telephone and email capabilities. A portable electronic device having email capabilities but not cellular telephone capabilities may also be used. All such modifications and variations are believed to be within the sphere and scope of the present embodiment.

The invention claimed is:

1. A method for presenting an attachment associated with an email message on a portable electronic device having a processor, a memory, a display, and an input device, the method comprising:
   receiving at the processor from the input device an instruction to open the email message;
   determining, at the processor, whether the attachment has been previously viewed at the portable electronic device:
   when the attachment is determined to have been previously viewed:
   determining whether the attachment is renderable as an image at the display by checking for renderable Document Object Model (DOM) identifiers inside a server descriptor associated with the attachment;
   when the attachment is determined to be renderable as an image at the display: retrieving image data corresponding to the attachment from the memory; and, presenting a message body of the email message on the display, and presenting the image data as a thumbnail image in the message body;
   when the attachment is determined not to be renderable as an image at the display: then presenting the message body on the display, and presenting a name of the attachment in the message body;
   when the attachment is determined not to have been previously viewed:
   presenting the message body on the display, and presenting the name of the attachment in the message body.

2. The method of claim 1, wherein the image data comprises an image encapsulated in Universal Content Stream (UCS) data.

3. The method of claim 1, wherein a size of the thumbnail image is 25% of a size of the image.

4. The method of claim 1, wherein the image data has a file format selected from the group consisting of: Joint Photographic Experts Group (JPEG), Graphics Interchange Format (GIF), Portable Network Graphics (PNG), bitmap (BMP) and Tagged Image. File Format (TIFF).

5. The method of claim 1, wherein the thumbnail image covers between 15 and 40 percent of the display.

6. The method of claim 1, wherein the instruction to open the email message is received at the processor via execution of a messaging application; the method further comprising:
   prior to the determining whether the attachment has been previously viewed
   at the portable electronic device, executing the messaging application to notify an attachment viewer application of the attachment;
   after retrieving the image data and prior to presenting the message body, executing the attachment viewer application to insert the thumbnail image into an attachment portion of the message body;
   wherein presenting the message body is performed by the processor via execution of the messaging application.

7. The method of claim 1, further comprising:
   when the attachment is determined to have been previously viewed on the display, presenting at least one of the name of the attachment and a size of the attachment in the message body in association with the thumbnail image.

8. The method of claim 1, wherein the determining whether the attachment is renderable as an image at the display further comprises determining whether the attachment is renderable in a format compatible with an attachment viewer application.

9. A portable electronic device, comprising: a memory;
a display;
an input device; and
a processor interconnected with the memory, the display and the input device, the processor configured to:
receive from the input device an instruction to open an email message having an attachment;
determine whether the attachment has been previously viewed at the portable electronic device;
when the attachment is determined to have been previously viewed:
determine whether the attachment is renderable as an image at the display by checking for renderable Document Object Model (DOM) identifiers inside a server descriptor associated with the attachment;
when the attachment is determined to be renderable as an image at the display: retrieve image data corresponding to the attachment from the memory; and, control the display to present a message body of the email message, and to present the image data as a thumbnail image in the message body;
when the attachment is determined not to be renderable as an image at the display; then present the message body on the display, and present a name of the attachment in the message body;
when the attachment is determined not to have been previously viewed:
control the display to present the message body, and to present the name of the attachment in the message body.

10. The portable electronic device of claim 9, wherein the image data comprises an image encapsulated in Universal Content Stream (UCS) data.

11. The portable electronic device of claim 9, wherein a size of the thumbnail image is 25% of a size of the image.

12. The portable electronic device of claim 9, wherein the image data has a file format selected from the group consisting of: Joint Photographic Experts Group (JPEG), Graphics Interchange Format (GIF), Portable Network Graphics (PNG), bitmap (BMP) and Tagged Image File Format (TIFF).

13. The portable electronic device of claim 9, wherein the thumbnail image covers between 15 and 40 percent of the display.

14. The portable electronic device of claim 9, the processor configured to receive the instruction to open the email message via execution of a messaging application; the processor further configured to;
prior to the determining whether the attachment has been previously viewed at the portable electronic device, execute the messaging application to notify an attachment viewer application of the attachment;
after retrieving the image data and prior to controlling the display, execute the attachment viewer application to insert the thumbnail image into an attachment portion of the message body;
control the display to present the message body via execution of the messaging application.

15. The portable electronic device of claim 9, the processor further configured to:
when the attachment is determined to have been previously viewed on the display, present at least one of the name of the attachment and a size of the attachment in the message body in association with the thumbnail image.

16. The portable electronic device of claim 9, wherein the processor is further configured to determine whether the attachment is renderable as an image at the display by further determining whether the attachment is renderable in a format compatible with an attachment viewer application.

17. A non-transitory computer-readable medium storing a computer program, wherein execution of the computer program is for presenting an attachment associated with an email message on a portable electronic device having a processor, a memory, a display, and an input device, by:
receiving at the processor from the input device an instruction to open the email message;
determining, at the processor, whether the attachment has been previously viewed at the portable electronic device;
when the attachment is determined to have been previously viewed:
determining whether the attachment is renderable as an image at the display by checking for renderable Document Object Model (DOM) identifiers inside a server descriptor associated with the attachment;
when the attachment is determined to be renderable as an image at the display: retrieving image data corresponding to the attachment from the memory; and, presenting a message body of the email message on the display, and presenting the image data as a thumbnail image in the message body;
when the attachment is determined not to be renderable as an image at the display; then presenting the message body on the display, and presenting a name of the attachment in the message body;
when the attachment is determined not to have been previously viewed:
presenting the message body on the display, and presenting the name of the attachment in the message body.

* * * * *

UNITED STATES PATENT AND TRADEMARK OFFICE
CERTIFICATE OF CORRECTION

| | | |
|---|---|---|
| PATENT NO. | : 9,608,948 B2 | Page 1 of 1 |
| APPLICATION NO. | : 14/068296 | |
| DATED | : March 28, 2017 | |
| INVENTOR(S) | : Olav A. Sylthe and Dan Mihai Dumitru | |

It is certified that error appears in the above-identified patent and that said Letters Patent is hereby corrected as shown below:

In the Claims

Claim 4, Column 6, Line 40: replace "Image.File" with -- Image File --

Claim 9, Column 7, Line 24: replace "display; then" with -- display: then --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*